United States Patent
Boufounos

(10) Patent No.: US 9,239,388 B2
(45) Date of Patent: Jan. 19, 2016

(54) PAIRWISE GROUPING OF JOINT SPARSITY MODELS FOR SENSING ARRAY PROCESSING

(71) Applicant: Mitsubishi Electric Research Laboratories, Inc., Cambridge, MA (US)

(72) Inventor: Petros T Boufounos, Boston, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 466 days.

(21) Appl. No.: 13/780,450

(22) Filed: Feb. 28, 2013

(65) Prior Publication Data

US 2014/0177384 A1 Jun. 26, 2014

Related U.S. Application Data

(63) Continuation-in-part of application No. 13/721,350, filed on Dec. 20, 2012.

(51) Int. Cl.

| G01K 9/00 | (2006.01) |
|---|---|
| G01S 15/89 | (2006.01) |
| G01S 13/89 | (2006.01) |
| G01S 15/87 | (2006.01) |
| G06K 9/62 | (2006.01) |
| G01S 7/54 | (2006.01) |
| G01S 15/00 | (2006.01) |

(52) U.S. Cl.
CPC ............... *G01S 15/89* (2013.01); *G01S 13/89* (2013.01); *G01S 15/876* (2013.01); *G06K 9/6249* (2013.01); *G01S 7/54* (2013.01); *G01S 15/003* (2013.01)

(58) Field of Classification Search
CPC ........... G01S 7/295; G01S 7/32; G01S 7/411; G01S 13/9035; G01S 2013/9064; G01S 7/54; G01S 15/003; G01S 15/89; G01S 15/876; G01S 13/89; G06K 9/6249

See application file for complete search history.

(56) References Cited

U.S. PATENT DOCUMENTS

| 2010/0001901 A1* | 1/2010 | Baraniuk et al. ............ 342/25 F |
| 2010/0215081 A1* | 8/2010 | Bajwa et al. ................. 375/147 |
| 2010/0289494 A1* | 11/2010 | Wald et al. ................... 324/318 |

\* cited by examiner

*Primary Examiner* — Luke Ratcliffe
*Assistant Examiner* — Hovhannes Baghdasaryan
(74) *Attorney, Agent, or Firm* — Dirk Brinkman; Gene Vinokur

(57) ABSTRACT

A scene is reconstructed by transmitting pulses into a scene from an array of transmitters so that only one pulse is transmitted by one transmitter at any one time. The one pulse is reflection by the scene and received as a set of signals. Each signal is sampled and decomposed to produce frequency coefficients stacked in a set of linear systems modeling a reflectivity of the scene. Then, a reconstruction method is applied to the set of linear systems. The reconstruction method solves each linear system separately to obtain corresponding solutions, which are shared and combined to reconstruct the scene.

14 Claims, 3 Drawing Sheets

300

PAIRWISE GROUPING OF JOINT SPARSITY MODELS FOR SENSING ARRAY PROCESSING

RELATED APPLICANTS

This is a continuation-in-part of U.S. patent applicant Ser. No. 13/721,350, "Method and System for Reconstructing Scenes Using Virtual Arrays of Transducers and Joint Sparsity Models," filed by Boufounos on Dec. 20, 2012, incorporated herein by reference. In that application, a scene is also reconstructed by receiving reflected pulses transmitted by a virtual array of transducers. A reconstruction method is applied to the set of linear systems to solve each linear system separately to obtain a corresponding solution, which are jointly combined.

The above application Ser. No. 13/721,350 is a continuation in part application of U.S. application Ser. No. 12/895,408 "Method and System for Sensing Objects in a Scene Using Transducer Arrays and Coherent Wideband Ultrasound Pulses," filed by Boufounos on Sep. 30, 2010, U.S. Publication 20120082004, incorporated herein by reference. That application detects objects in a scene using wideband ultrasound pulses. The application uses the same principles during signal acquisition, but a different reconstruction approach, which assumed transducers relative positions are known with a sufficient degree of accuracy.

FIELD OF THE INVENTION

This invention relates generally to sensing a scene with a sensing array, and more particularly to reconstructing the scene as an image using compressive sensing to detect objects in the scene.

BACKGROUND OF THE INVENTION

In the prior application U.S. application Ser. No. 12/895,408, pulses are transmitted into a scene by an array of transducers. A pattern of wideband ultrasound frequencies in each pulse is unique with respect to the patterns of each other pulse. Received signals are sampled and decomposed using a Fourier transform to produce frequency coefficients, which are stacked to produce a linear system modeling a reflectivity of the scene, which is reconstructed as an image. The principles in the signal acquisition described therein are similar as for the present application, however the reconstruction methodology is not.

In the prior application Ser. No. 13/721,350, a scene is also reconstructed by receiving reflected signals due to pulses transmitted by a virtual array of transducers. The virtual array has a set of configurations subject to positioning errors. The received signal are sampled and decomposed to produce frequency coefficients stacked in a set of linear systems modeling a reflectivity of the scene. There is one linear system for each array configuration. A reconstruction method is applied to the set of linear systems. The reconstruction method solves each linear system separately to obtain a corresponding solution. The corresponding solutions share information during the solving, and the solutions are combined to reconstruct the scene.

One issue with the prior applications is the accuracy the array positioning. An ultrasonic array operating at 50 kHz has a wavelength of approximately 6.88 mm, which means that element positioning needs be accurate to less than a millimeter. Such tolerances are difficult to manufacture, especially in a mass-produced system. Another issue is the computational complexity of the reconstruction process, particularly when convex optimization or greedy methods are used in and embedded system with limited resources.

It is desired to improve on the reconstruction used in the related applications.

SUMMARY OF THE INVENTION

A scene is reconstructed by transmitting pulses into a scene from an array of transmitters so that only one pulse is transmitted by one transmitter at any one time.

The one pulse is reflection by the scene and received as a set of signals. Each signal is sampled and decomposed to produce frequency coefficients stacked in a set of linear systems modeling a reflectivity of the scene.

Then, a reconstruction method is applied to the set of linear systems. The reconstruction method solves each linear system separately to obtain corresponding solutions, which are shared and combined to reconstruct the scene.

DETAILED DESCRIPTION OF THE PREFERRED EMBODIMENTS

Figure 1:
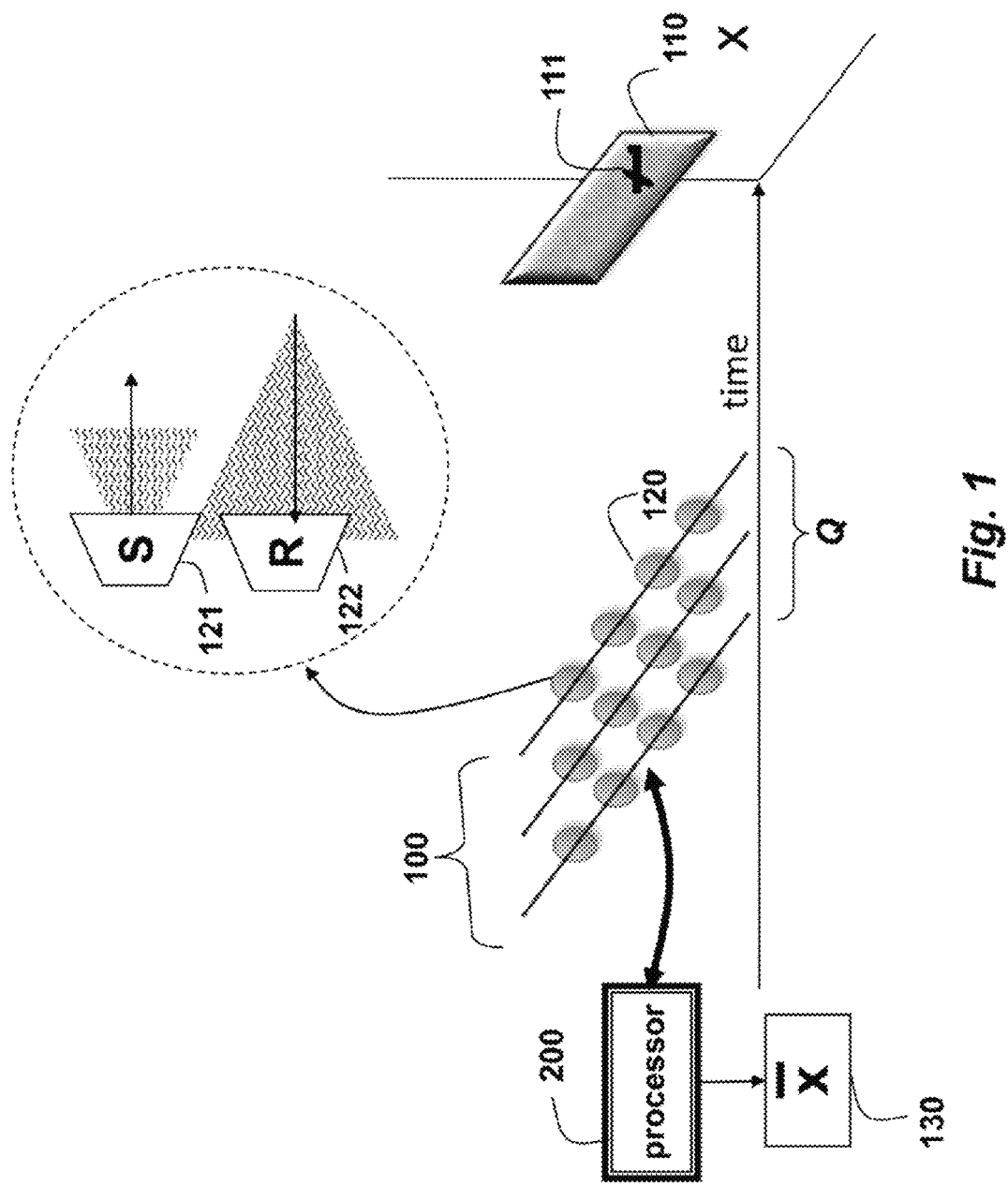
FIG. 1 is a schematic of an array of transducers for reconstructing a scene according to some embodiments of the invention.

As shown in FIG. 1, some embodiments of the invention reconstruct a scene x 110 as X 130 using an array 100 of elements 120. The reconstruction can detect an object 11 in the scene. Each sensing element can be a transducer can include a transmitter (S) 121 and a receiver (R) 122.

The transmitters transmit pulses. The transmitted pulses are reflected by reflectors in the scene, e.g., the object, and received as echo signals. The received signals have deformed waveforms due to the impulse response, and no longer can be considered "pulses." In one embodiment, the pulses use wideband ultrasound, although other sensing modalities and frequencies, e.g., light and radio pulses are also possible. The transmitters and the receivers can be discrete physical devices or transducers operating as either transmitters of the pulses and receivers of the reflected signals by switching between transmit and receive modes.

That is physically, one transmitter transmits and several receivers receive concurrently, e.g., four. The reconstruction problem is solved by treating the four pairs individually and form four separate problems, i.e., four separate instances because each of the receivers receives independently of the other receivers, even though there is only one transmitter.

If the scene is relatively static, in the time-frame of transmitting pulses and receiving reflected signals, then a single transmitter sequentially transmits the same pulse four separate times and each time a single receiver is turned on. Alternatively, four receivers can concurrently receive signals in response to a single transmitted pulse. Mathematically, if the scene is the same, both situations are the same. The first case is used to model and describe the system and reconstruct the scene with the reconstruction method because it is robust to element positioning. The second case can be used in actual physical system because it only transmits once, so it is faster.

In one configuration, the transducers are arranged linearly in a first dimension, and over time, move laterally along a second dimension to form a 2D virtual array having a set (of one or more) configuration instances. Other configuration instances (Q) and 3D arrays are also possible because the transducers can be activated individually. Furthermore, the array can be regular or irregular, and transmitters and receivers do not need to occur in pairs and or be colocated. For example, there can be more receivers than transmitters. However, the preferred embodiment uses one transmitter for a set of receivers, and then forms notional sensing pairs such the transmitter and each receiver in the set forms a sensing pair.

Reconstruction Methodology

Figure 2:
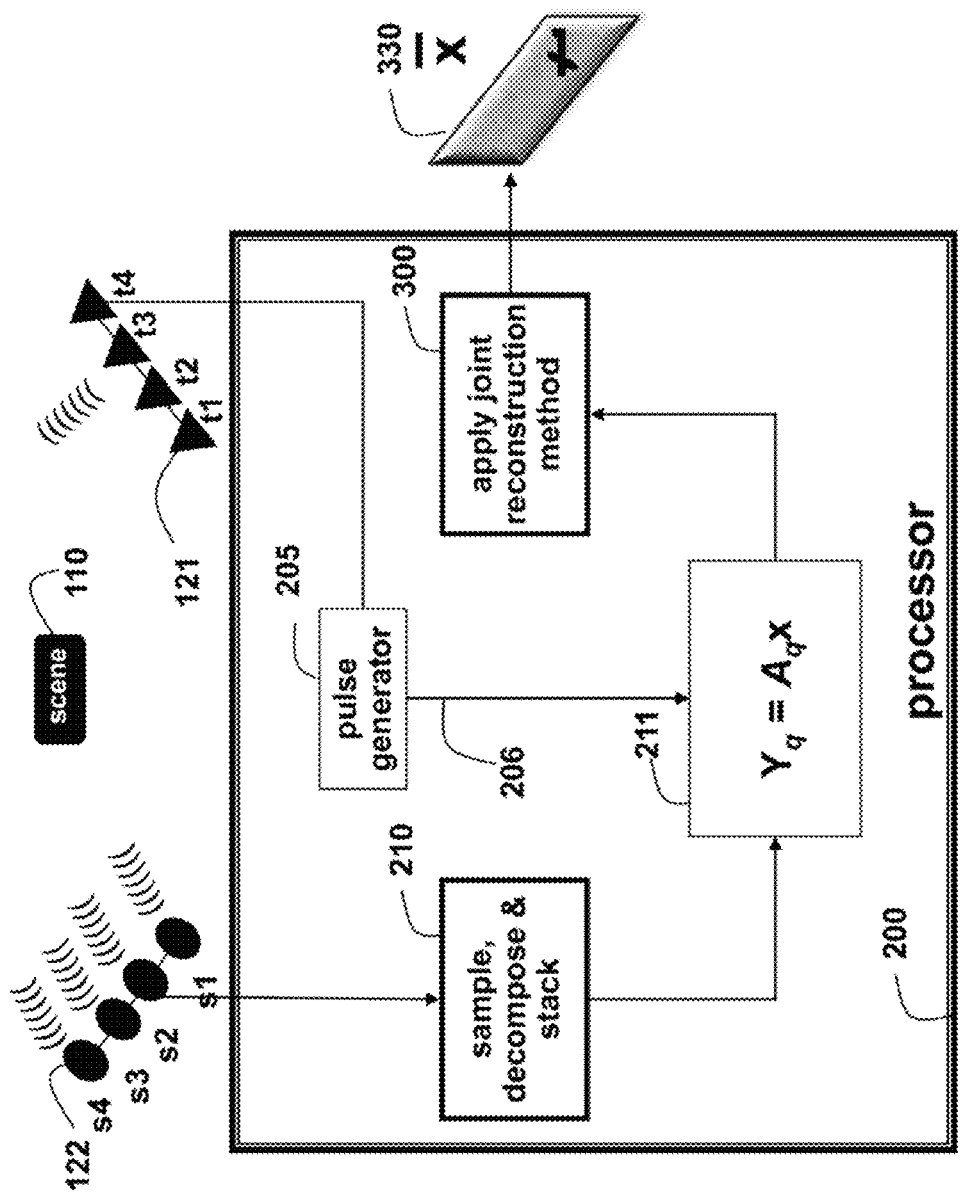
FIG. 2 is a block diagram of a method for reconstructing the scene according to some embodiments of the invention.

FIG. 2 shows a method for reconstructing a scene according to embodiments of the invention. Pulses transmitted by each transducer can be represent by discrete-time samples at a Nyquist rate, i.e., twice the bandwidth of the pulse, with a corresponding sampling period (T), which is also useful for digital pulse generation and processing 210 of the received signals. The pulse generator 205 also provides pulsing information 206 useful for the processing of the received pulses. In the example instance shown, the four array instances are pairs {t3 s1} {t3 s2} {t3 s3} {t3 s4}.

The received signals are sampled, digitized and stacked in an array and then processed as a linear system 211. The methodology to form the linear system is as described in the related applications. Then, the reconstruction method 300 is applied to the linear system 211 produce the reconstructed scene $\overline{X}$ 330.

The method is described in greater detail below with reference to FIG. 3. The method can be performed in a processor 200 connected to memory and input/output interfaces as known in the art.

The method can be used for 2-D and 3-D scene reconstruction. The array comprises Q configuration instances. These can be instances, for example, of the same array as the array moves relative to a static scene, of a larger array with parts activated at each time, combinations of the above, or other manifestation of a virtual array or a physical array.

Each configuration instance q in the set Q, for q=1, ..., Q, includes $S_q$ transmitters and $R_q$ receivers. Each transmitter transmits a pulse $$p_{sq}(t), q=1, \ldots, Q, s=1, \ldots, S_q,$$

denoted by $P_{sq}(\Omega)$ in a frequency domain. The reflected pulses are received as a signals $y_{rq}(t) q=1, \ldots, Q, s=1, \ldots, R_q$ at each receiver, denoted $Y_{rq}(\Omega)$ in the frequency domain.

The preferred embodiments use array instances formed by pairs of transmitters and receivers. This means that in the preferred embodiment one transmitter is transmitting a pulse to the scene at any time instance and a set of one or more receivers receives the reflected signals. As described above, in the preferred embodiment, each of those receivers forms a sensing pair with the transmitter. Other configuration instances can also be used by the reconstruction method described herein. However, those configurations may be sensitive to errors in array positioning.

In the preferred embodiment, there are Q=S×R configuration instances for a single physical array, where S and R is the number of transmitters and receivers, respectively. For a virtual array arranged at L distinct positions and pulsing from all transmitters, sequentially, at each position there are Q=L×S×R configuration instances.

In the preferred embodiment, only one of the transmitters transmits a pulse at any one time, which means that there is no interference from other transmitted pulses. This means that the same shape pulse p(t) can, but does not have to, be used for all array configuration instances, i.e., $p_{sq}(t)=p(t)$.

In the related application, multiple transmitters transmit pulses at the same time, requiring each transmitter to transmit a distinct pulse and that all the pulses transmitted simultaneously must be orthogonal or incoherent to each other. This increases the complexity and cost of the system.

The present application enables the system to use a pulse that is the same for all transmitters. This simplifies the hardware design. Now, the hardware generates and transmits a single pulse shape at any time, instead of having to be flexible and transmit multiple different shaped pulses.

To reconstruct the objects sensed by the array, a static discretized scene of size N is considered. The scene can be 2-dimensional (2D), or 3-dimensional (3D). Discretizing the scene means that a grid of N points in the scene is formed, e.g., $N=N_x \times N_y$ for a 2D scene or $N=N_x \times N_y \times N_z$. The pulse at each point n in the scene is reflected according to the reflectivity x, of that point. The reflectivity of the whole scene is compactly denoted using $x \in \mathfrak{R}^N$.

Every point n in the scene is a distance $d_{nsq}$ from the transmitter s and a distance $d_{nsrq}$ from the receiver r, which comprises array instance q, for a total distance $d_{nsrq}$ in the path from transmitter s to receiver r, comprising array instance q, as reflected from scene point n.

Let c denote the speed of wave propagation in the modality, e.g., the speed of sound for ultrasonic sensing or the speed of light for radio or optical transmission. Then, the total delay between transmitting the pulse and receiving the signal reflected by scene point n at array instance q is $\tau_{nsrq}=d_{nsrq}/c$.

Given the scene reflectivity x, the signal received at receiver r for array instance q is $$Y_{rq}(\Omega) = \sum_n x_n \sum_s e^{-j\Omega \tau_{nsrq}} P_{sq}(\Omega), \qquad (1)$$

which is a linear transfer function. By discretizing in frequency $\Omega$, i.e., evaluating equation (1) at F discrete frequency points $\{\Omega_1, \ldots, \Omega_F\}$, the linear transfer function for array instance l can be expressed as a matrix equation, $$Y_q = A_q x, \qquad (2)$$

where equation $$Y_q = \begin{bmatrix} Y_{1q}(\Omega_1) \\ \vdots \\ Y_{1q}(\Omega_F) \\ \vdots \\ Y_{rq}(\Omega_f) \\ \vdots \\ Y_{Rq}(\Omega_1) \\ \vdots \\ Y_{Rq}(\Omega_F) \end{bmatrix}, \qquad (3)$$

$$A_q = \begin{bmatrix} \sum_s e^{-j\Omega_1 \tau_{1s1q}} P_{sq}(\Omega_1) & \cdots & \sum_s e^{-j\Omega_1 \tau_{ns1q}} P_{sq}(\Omega_1) & \cdots & \sum_s e^{-j\Omega_1 \tau_{Ns1q}} P_{sq}(\Omega_1) \\ \vdots & \ddots & \vdots & \ddots & \vdots \\ \sum_s e^{-j\Omega_F \tau_{1s1q}} P_{sq}(\Omega_F) & \cdots & \sum_s e^{-j\Omega_F \tau_{ns1q}} P_{sq}(\Omega_F) & \cdots & \sum_s e^{-j\Omega_F \tau_{Ns1q}} P_{sq}(\Omega_F) \\ \vdots & \ddots & \vdots & \ddots & \vdots \\ \sum_s e^{-j\Omega_f \tau_{1srq}} P_{sq}(\Omega_f) & \cdots & \sum_s e^{-j\Omega_f \tau_{nsrq}} P_{sq}(\Omega_f) & \cdots & \sum_s e^{-j\Omega_f \tau_{Nsrq}} P_{sq}(\Omega_f) \\ \vdots & \ddots & \vdots & \ddots & \vdots \\ \sum_s e^{-j\Omega_1 \tau_{1sRq}} P_{sq}(\Omega_1) & \cdots & \sum_s e^{-j\Omega_1 \tau_{nsRq}} P_{sq}(\Omega_1) & \cdots & \sum_s e^{-j\Omega_1 \tau_{NsRq}} P_{sq}(\Omega_1) \\ \vdots & \ddots & \vdots & \ddots & \vdots \\ \sum_s e^{-j\Omega_F \tau_{1sRq}} P_{sq}(\Omega_F) & \cdots & \sum_s e^{-j\Omega_F \tau_{nsRq}} P_{sq}(\Omega_F) & \cdots & \sum_s e^{-j\Omega_F \tau_{NsRq}} P_{sq}(\Omega_F) \end{bmatrix},$$

is the matrix representation of the linear transfer function of array instance q.

Scene Reconstruction

The goal of reconstruction is to recover the scene x using the measurements $Y_q$, q=1, ..., Q. The approach taken in the previous application Ser. No. 12/895,408 formulates a single problem by combining all the array instances into one linear system, $$\begin{bmatrix} Y_1 \\ \vdots \\ Y_q \\ \vdots \\ Y_Q \end{bmatrix} = \begin{bmatrix} A_1 \\ \vdots \\ A_q \\ \vdots \\ A_Q \end{bmatrix} x, \quad (4)$$

and the solving the system for x. The previous application exploits the sparsity of x, to invert the system using compressive sensing (CS)

Note, array instances are referred to as "positions" in the related applications. This description uses the term instances, to encompass more general configurations in which, for example, the array is static and different transmitters and receivers are active at any one time.

One of the issues with the previous approach is inaccuracy due to positioning errors. Specifically, the previous formulation assumes that the relative positioning of all the array elements (transmitters and receivers) is known accurately when inverting the problem to determine x. This is because the reconstruction relies on coherent acquisition of all the signals at all array instances. Positioning errors break this coherency assumption, and reduce the reconstruction performance.

Unfortunately, it is often not possible to know the relative positioning of the array elements at all the configuration instances at the desired accuracy, especially with virtual arrays that use a moving platform to achieve the positioning. Typically, it is desired that the position of the array elements is accurate to a small fraction of half the wavelength of the transmitted signal. For example, in over-the-air ultrasonic arrays operating around 50 kHz center frequency, the wavelength is approximately λ=7 mm, and the positions of the receivers should be know within a small fraction of λ/2=3.5 mm. Therefore, it is often not possible to determine the position of the array to the desired accuracy.

In applicant Ser. No. 13/721,350, each of the Q configurations is considered as separate problem to be solved, with each solution informing the other solutions. By treating each problem separately, the model only requires accurate knowledge of the position of the elements, and the coherency of the data are maintained within each of the Q configurations.

Specifically, instead of reconstructing a single x using equation (4), Q vectors, $x_q$ can be reconstructed, one from each instance of the matrix equation (2). In other words, Q transfer equations are used to invert for $x_q$ on each instance:

$$Y_q = A_q x_q, q=1, \ldots, Q. \quad (5)$$

It is assumed that the scene is essentially the same in all the array instances. More specifically, it is assumed that the sparsity pattern of the scene is the same for all instances, i.e., $x_q$ have non-zeros at the same location in the scene for all q=1, ..., Q. In other words, all reconstructed scenes $x_q$ share a joint sparsity pattern. That application uses computationally complex reconstruction processes, which require a number of iterations to be executed.

Reconstruction Method Details

Figure 3:
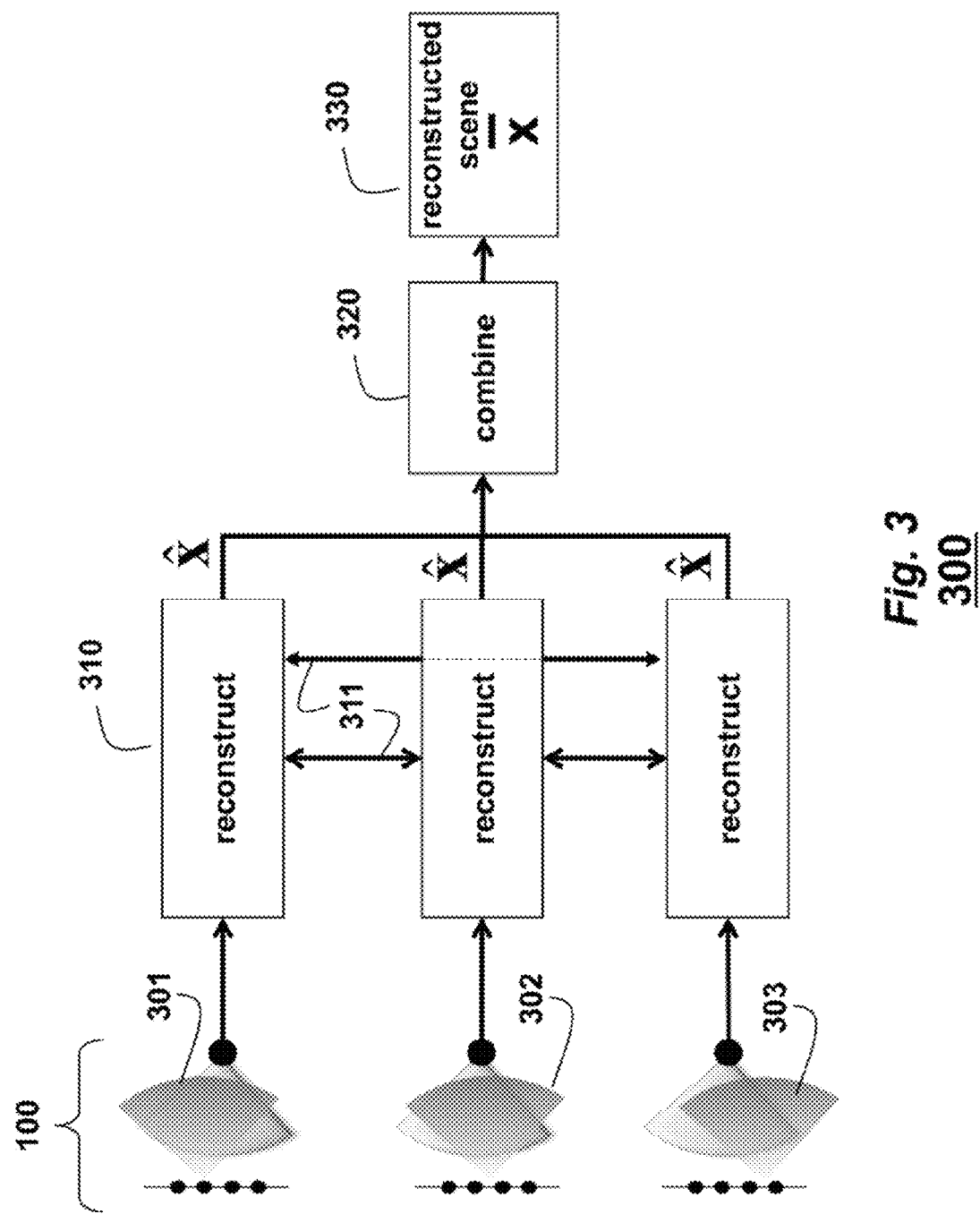
FIG. 3 is a block diagram of joint reconstruction method according to some embodiments of the invention.

FIG. 3 shows the joint reconstruction method 300 in greater detail for the array 100 for three instances 301-303, each corresponding to an array configuration q. During the reconstruction, each instance produces a scene reconstruction 310 that is non-zero at the same scene location as the reconstructions from the other configurations. The reconstructions from all the configurations are then combined 320 to produce the reconstructed scene 330.

The method as described herein is not iterative. In a single step, the method determines a single-step backprojection for each of the array instance. Then, the backprojections are combined 320 to identify the support of the non-zero elements in the scene. Specifically, for each array instance, the method estimates $$\hat{x}_q = A_q^T Y_q, q=1, \ldots, Q, \quad (6)$$

wherein T is the transpose operator.

To determine the joint sparsity pattern, a number of processes can be used to take into account the backprojection of each array instance. In the preferred embodiment, the reconstruction 310 may determine a total energy e at each scene location among the configuration instances $$e_n = \sqrt{\sum_q (\hat{x}_q)_n^2},\qquad(7)$$

where $e_n$ denotes the $n^{th}$ coefficient of the energy vector e.

Typically, the scene is sparse, but for any objects. Therefore, the vector e can be further processed by thresholding. For example, only the K largest coefficients of the energy vector e are preserved, and all others are set to zero.

Alternatively, all the coefficients of e can be compared to a threshold $\tau$, and the coefficients with magnitude greater than $\tau$ are preserved, while coefficients with magnitude less than $\tau$ are set to zero.

Often, only the locations of the reflectors in the scene are of interest, and not in the values of their reflectivity. The system can also output only the location in the scene of the K largest coefficients, or the location in the scene of the coefficients larger than $\tau$.

The reconstruction may also use any of the methods in the related application such as, but not limited to, a greedy algorithm, a matching pursuit (MP) algorithm, an orthogonal matching pursuit (OMP) algorithm, a joint iterative hard thresholding (IHT) algorithm, a joint Compressive Sampling Matching Pursuit (CoSaMP) algorithm, or an optimization-based algorithm for jointly sparse recovery. If a model for the scene is known, then model-based compressive sensing reconstruction methods can be used.

The advantage of the method in the preferred embodiment over the methods in the related application is that the former is not iterative and, therefore, less computationally complex. The latter is significantly more complex but might also produce slightly more accurate reconstruction.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A system for reconstructing a scene using an array of transmitters and receivers, comprising:
    a transmitter for transmitting pulses into the scene, wherein at any one time one pulse is transmitted by the transmitter;
    a set of receivers for receiving the one pulse after reflection by reflectors at locations in the scene as a set of signals, wherein the one transmitter and each receiver in the set of receivers form a sensing pair for an array instance;
    a processor, connected to the transmitter and the set of receivers, for sampling and decomposing each signal in the set of signals to produce frequency coefficients stacked in a set of linear system of equations modeling a reflectivity of the scene, wherein there is one linear system for each sensing pair, applying a reconstruction method to the set of linear system of equations, wherein the reconstruction method solves each linear system of equation separately to obtain a corresponding solution, while the corresponding solutions share information of a joint sparsity pattern of the scene during the solving, combines the solutions to reconstruct the scene, and determines a total energy of the solutions at each location.

2. The system of claim 1, wherein the set of signals corresponding to the one pulse are received concurrently by the set of receivers.

3. The system of claim 1, wherein the transmitter transmits one pulse sequentially for each receiver in the set receivers, and the sets of signals are received sequentially by each receiver in the set of receivers.

4. The system of claim 1 wherein the solving comprises the steps of:
    determining a backprojection for each linear system of equation;
    combining the backprojections to determine a combined backprojection;
    determining a common support from the combined backprojection; and
    using the common support to solve the linear system of equations.

5. The system of claim 4 wherein the determining of the common support only uses a predetermined number of the coefficients having a largest magnitude.

6. The system of claim 4 wherein the determining of the common support only uses the coefficients having a magnitude greater than a predetermined threshold.

7. The system of claim 4 wherein the combining determines a total energy of the backprojections at each location in the scene.

8. The system of claim 4 wherein the solution is equal to the combined backprojection at each location of the common support and zero elsewhere.

9. The system of claim 4 wherein the solution is the location of the common support.

10. The system of claim 1 wherein the reconstruction method is a greedy algorithm.

11. The system of claim 10 wherein the greedy algorithm is a joint sparsity iterative hard thresholding algorithm.

12. The system of claim 10 where in the greedy algorithm is a joint Compressive Sampling Matching Pursuit algorithm.

13. The system of claim 1, wherein the reconstruction method is an optimization-based algorithm for jointly sparse recovery.

14. The system in claim 1, wherein the combining determines the location of the common support of the solution.

* * * * *